(12) United States Patent
Rollins

(10) Patent No.: US 9,798,041 B2
(45) Date of Patent: Oct. 24, 2017

(54) SENSITIVITY OPTIMIZATION OF INDIVIDUAL LIGHT CURTAIN CHANNELS

(71) Applicant: Rockwell Automation Technologies, Inc., Mayfield Heights, OH (US)

(72) Inventor: George Rollins, Lowell, ME (US)

(73) Assignee: Rockwell Automation Technologies, IInc., Mayfield Heights, OH (US)

( * ) Notice: Subject to any disclaimer, the term of this patent is extended or adjusted under 35 U.S.C. 154(b) by 232 days.

(21) Appl. No.: 14/580,187

(22) Filed: Dec. 22, 2014

(65) Prior Publication Data

US 2016/0178794 A1    Jun. 23, 2016

(51) Int. Cl.
*G01V 8/20* (2006.01)
*G01J 1/20* (2006.01)

(52) U.S. Cl.
CPC . *G01V 8/20* (2013.01); *G01J 1/20* (2013.01)

(58) Field of Classification Search
CPC ..... G01V 8/20; G01V 8/10; F16P 1/00; F16P 3/00; G01S 17/026; G08B 13/183; G01J 1/32; G01J 1/10; G01J 1/18; G01J 1/20
USPC ...... 250/221, 205, 214 R, 214 AG; 340/555, 340/556; 72/14.1, 14.3, 21.1, 21.3; 100/341, 342
See application file for complete search history.

(56) References Cited

U.S. PATENT DOCUMENTS

| 5,336,882 A | 8/1994 | Fooks et al. |
| 5,393,973 A * | 2/1995 | Blau ........................ G01V 8/20 250/221 |
| 2005/0109919 A1 * | 5/2005 | Osako ....................... G01D 5/26 250/221 |
| 2007/0213871 A1 | 9/2007 | Whitten et al. |
| 2010/0193668 A1 | 8/2010 | Kawabata |

FOREIGN PATENT DOCUMENTS

| DE | 10239222 A1 * | 3/2004 | ............... G01V 8/10 |
| DE | 102013223333 | 5/2014 | |

OTHER PUBLICATIONS

Extended European Search Report for EP Patent Application Serial No. EP15201994.9, dated Jun. 13, 2016, 7 pages.
European Office Action for EP Patent Application Serial No. EP15201994.9, dated Jul. 18, 2016, 2 pages.
European Office Action for EP Patent Application Serial No. EP15201994.9, dated Mar. 1, 2017, 4 pages.

* cited by examiner

*Primary Examiner* — Que T Le
*Assistant Examiner* — Jennifer Bennett
(74) *Attorney, Agent, or Firm* — Amin, Turocy & Watson, LLP

(57) ABSTRACT

A light curtain controller is provided that serially tunes or optimizes the operating margin of each channel during an initialization sequence. The controller measures and adjusts the operating margin for each emitter-receiver pair individually, such that the margin for each channel satisfies a defined optimization criterion. In this way, the light curtain's unique environmental and installation conditions are taken into account when tuning each channel. By individually tuning each emitter-receiver pair, the operating margin of each channel is set sufficiently high to ensure accurate object detection, while excessive margin is limited to prevent signal processing errors, such as those associated with adjacent-channel signal bleed-through, susceptibility to internal and external noise, etc.

20 Claims, 15 Drawing Sheets

SENSITIVITY OPTIMIZATION OF INDIVIDUAL LIGHT CURTAIN CHANNELS

BACKGROUND

The subject matter disclosed herein relates generally to industrial light curtains, and, more particularly, to techniques for tuning a light curtain's operating margins individually for each channel to facilitate optimal object detection in a range of variable operating conditions.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an light curtain control system is provided comprising an emitter control component configured to select an emitter element of a channel of a light curtain and instruct the emitter element to emit a light beam; a margin measurement component configured to determine an operating margin for the channel based on a measured signal generated by a receiver element of the channel in response to receipt of the light beam; and a margin adjustment component configured to adjust the operating margin for the channel based on a comparison of the operating margin with a defined margin criterion.

A method for tuning operating margins for a light curtain is also described, wherein the method comprises selecting, by a system comprising a processor, a channel of the light curtain for tuning; instructing, by the system, an emitter element of the channel to emit a light beam; measuring, by the system, an operating margin for the channel based on a measured signal at a receiver element of the channel; and adjusting, by the system, the operating margin for the channel in response to a determination that the operating margin does not satisfy a defined margin criterion.

Also, in one or more embodiments, a non-transitory computer-readable medium is provided having stored thereon instructions that, in response to execution, cause a system to perform operations, the operations comprising selecting an emitter-receiver pair of a light curtain; instructing an emitter element of the emitter-receiver pair to emit a light beam; measuring an operating margin for the emitter-receiver pair based on a magnitude of a signal generated by a receiver element of the emitter-receiver pair in response to receipt of the light beam; and adjusting the operating margin for the emitter-receiver pair in response to a determination that the operating margin does not satisfy a defined margin criterion.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
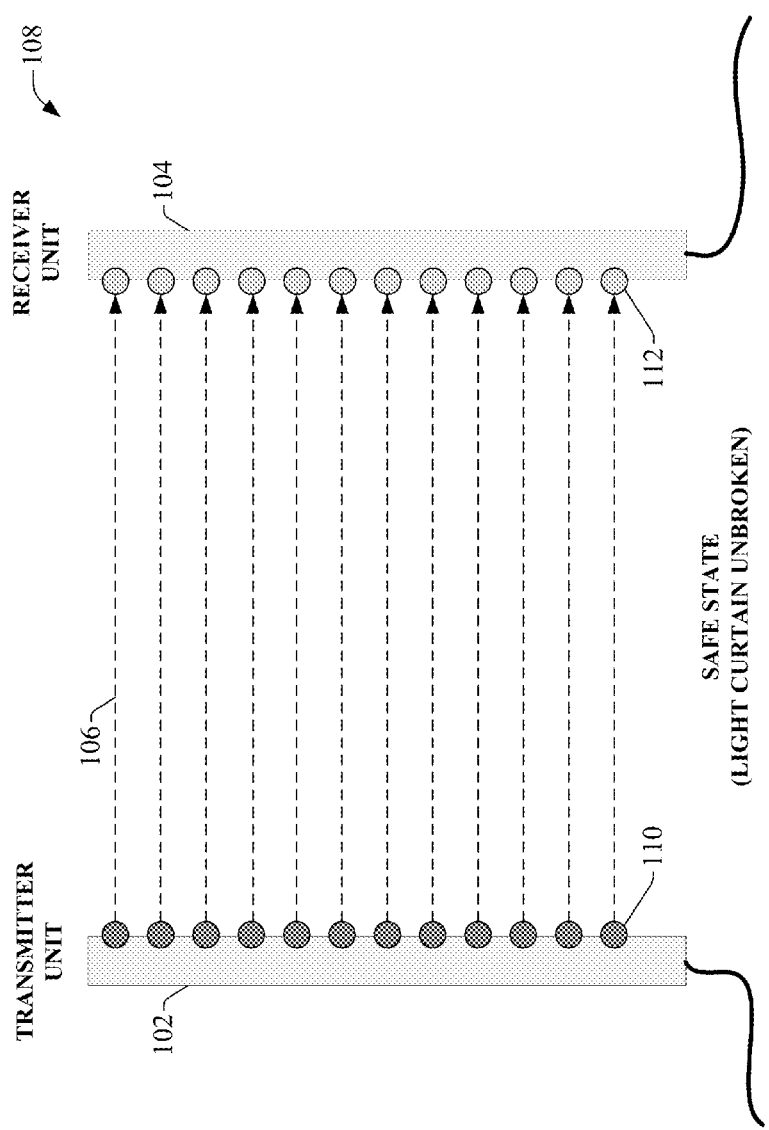
FIG. 1 is a diagram illustrating operation of an example light curtain.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial automation systems incorporate light curtains to detect the presence of objects or people at certain locations around a controlled process or machine. FIG. 1 is a diagram illustrating operation of an example light curtain 108. Light curtains typically comprise a transmitter unit 102 and a receiver unit 104. Transmitter unit 102 comprises an array of emitter elements 110 mounted in series on a bar structure. Each of the emitter elements 110 is configured to emit a modulated light beam 106 toward a corresponding receiver element 112 of the receiver unit 104. Each receiver element 112 is configured to detect presence or absence of the light beam emitted by its corresponding emitter element 110.

Figure 2:
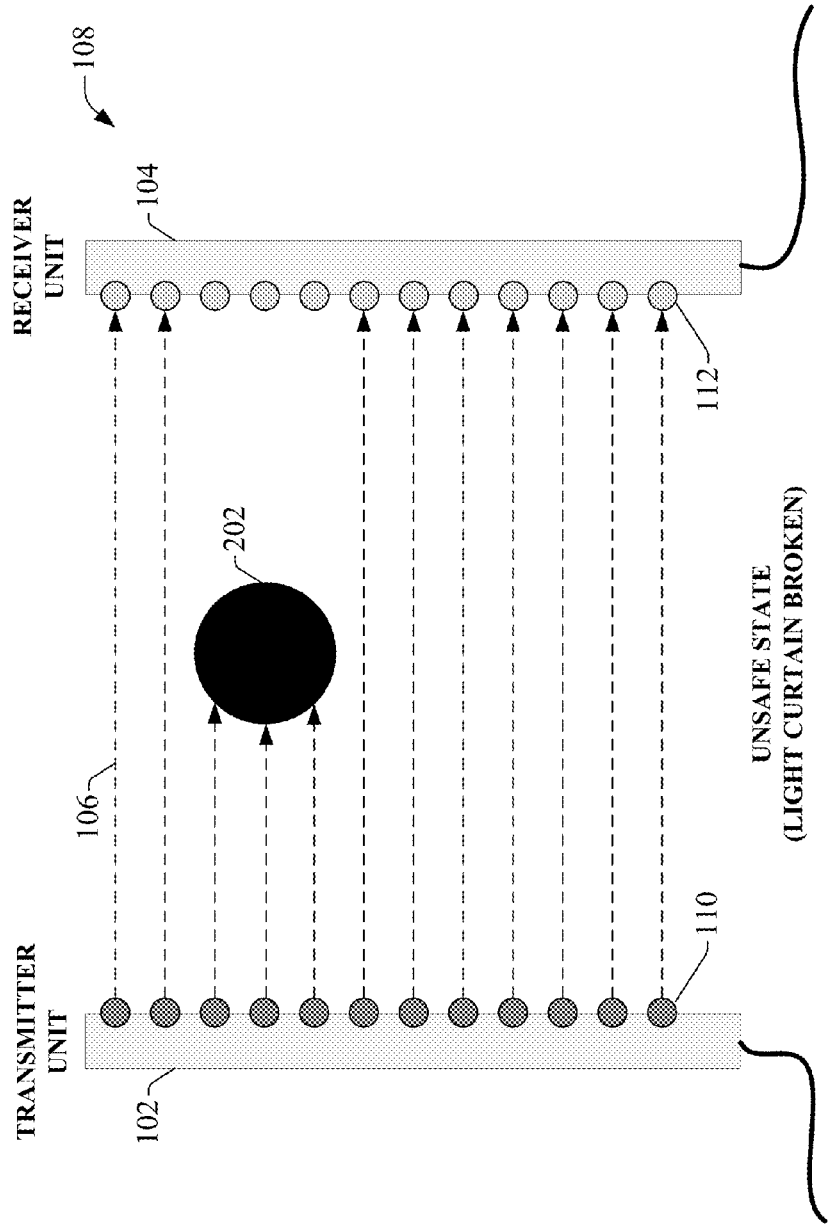
FIG. 2 is a diagram illustrating detection of an object by a light curtain.

The light curtain's controller is configured to generate an output signal indicating a safe state as long as each receiver element 112 detects its corresponding light beam. As long as all light beams are detected by their associated receiver elements, it is assumed that no objects are located between the transmitter and receiver units. FIG. 2 is a diagram illustrating detection of an object 202 by light curtain 108. When object 202 (e.g., a human appendage or other obstruction) passes between transmitter unit 102 and receiver unit 104, the object 202 blocks one or more of the emitted light beams, preventing the corresponding receiver elements 112 from receiving the beams. Upon detecting the loss of one or more beams at any of the receiver elements, the light curtain's controller changes the state of its output signal to indicate an unsafe state. Depending on the particular industrial application in which the light curtain is being used, the unsafe state output will typically cause the relevant portion of the industrial system to switch to a safe mode to prevent possible injury or equipment damage.

For example, the light curtain may be used as part of a safety system designed to prevent injury resulting from an operator extending an arm into a potentially hazardous part of the industrial system during normal operation. In such applications, the transmitter and receiver units may be mounted across from each other in front of an access opening that allows a human operator to reach into the hazardous area as long as the industrial system is not running Since the beams 106 are emitted across this access opening, a human hand passing through the opening will interrupt one or more of the beams 106, causing the light curtain to signal an unsafe state. If the light curtain detects this unsafe state while the industrial system is running, the unsafe state output will cause the safety system to isolate power from selected devices of the system, causing the system to stop running and removing the hazard.

Figure 3:
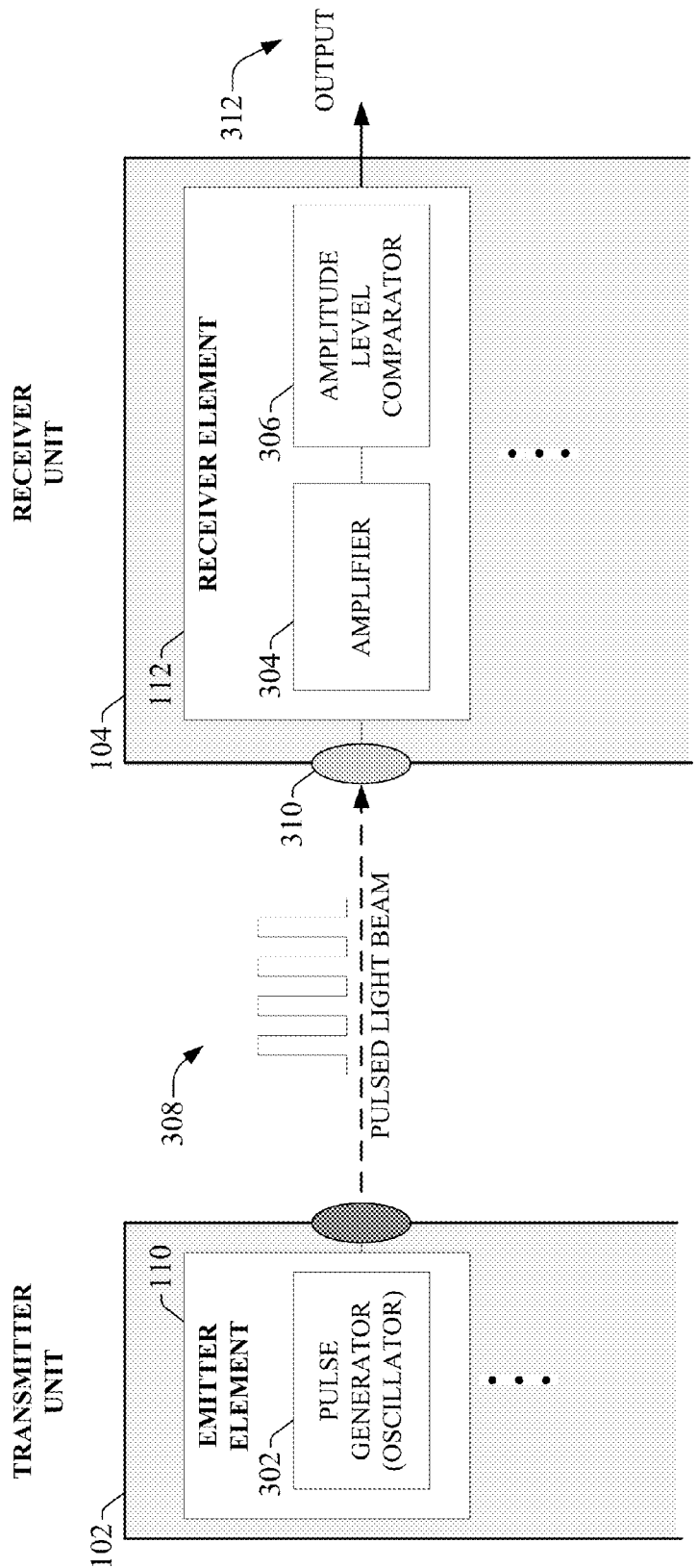
FIG. 3 is a diagram illustrating transmitter and receiver elements of an example light curtain.

FIG. 3 is a diagram illustrating transmitter and receiver elements of an example light curtain in more detail. It is to be appreciated that the light emission and detection technique described in connection with FIG. 3 is only intended to be exemplary, and that the sensitivity optimization techniques described herein are not limited to specific type of emitter and receiver depicted in FIG. 3. In this example, emitter element 110 comprises a pulse generator 302 (also referred to as an oscillator) that modulates a light beam into a stream of high-frequency light pulses 308 directed to the receiver element 112. The light pulses 308 may be projected via a light emitting diode (LED), laser, or other current-driven light source. By emitting the light beam as a series of pulses, the emitter element 110 creates a distinctive light pattern that the receiver element 112 can recognize and distinguish from ambient (non-pulsed) light. The receiver element 112 receives the pulsed light beam via window 310. The light beam is converted to an electrical signal that is passed through an amplifier 304, and an amplitude level comparator 306 determines whether the magnitude of the amplified signal exceeds a threshold indicating that the light beam was received at window 310. The receiver element 112 controls an output 312 to the light curtain's controller based on a result of the comparison.

The strength of the signal generated by the receiver element 112 as a function of the amount of emitted light detected by the receiver element 112 is referred to as the operating margin for that particular emitter-receiver pair. A given receiving element requires a certain minimum amount of light—or a corresponding minimum signal level—in order to confirm presence of the emitted light beam. Accordingly, the margin must be sufficiently high to ensure accurate reporting of the presence or absence of an object. The margin is typically given as a multiple of the minimum amount of light (X) required to switch the output from the unsafe state to the safe state (e.g., 2X, 3X, etc.).

A number of variables affect the margin for each emitter-receiver pair, including but not limited to the intensity of the light beam emitted by the emitter element, the distance between the transmitter and receiver units, the accuracy of alignment between the transmitter and receiver units, the gain setting of the receiver element's amplifier 304, the amount of pollution (e.g., particulates or smoke) between the emitter element and the transmitter element, an amount of mechanical vibration induced by the structure on which the light curtain is mounted, and other such variables. Typically, installers attempt to optimize the margins for the emitter-receiver pairs by aligning the transmitter and receiver units as accurately as possible. However, while accurate alignment may yield a guaranteed minimum operating margin for each emitter-receiver pair, this procedure may result in excessive margin for some of the pairs. An excessively high operating margin for a given emitter-receiver pair—also referred to as a channel—could impair signal processing by the pair's receiver by saturating the receiver element's amplifier or by making the receiver more susceptible to noise from a variety of internal and external sources, including but not limited to electromagnetic interference, adjacent-channel signal bleed-through, etc. These problems associated with excessively high operating margin can prevent detection of objects by the light curtain. Limiting excess margin is difficult, since conventional light curtains have no means for controlling the receiver gains, or only have a limited number of selectable gain settings which are applied to all channels globally.

To address these and other issues, one or more embodiments described herein provide a light curtain that serially optimizes the operating margin of each emitter-receiver pair during initialization. To this end, the light curtain's initialization algorithm includes a margin optimization sequence that individually measures and adjusts the margin for each emitter-receiver pair to bring each channel into conformance with a defined optimization criterion. By performing this initialization sequence after installation and power-up, the unique conditions of the light curtain's environment and installation are taken into consideration when adjusting the margin for each emitter-receiver pair. In some embodiments, the margin is adjusted by modifying the gain of the receiver element's amplifier. In other embodiments, the margin is adjusted by modifying the intensity of the beam emitted by the emitter element. In still other embodiments, both the beam intensity and the receiver gain can be adjusted to yield an operating margin that satisfies the optimization criterion.

Figure 4:
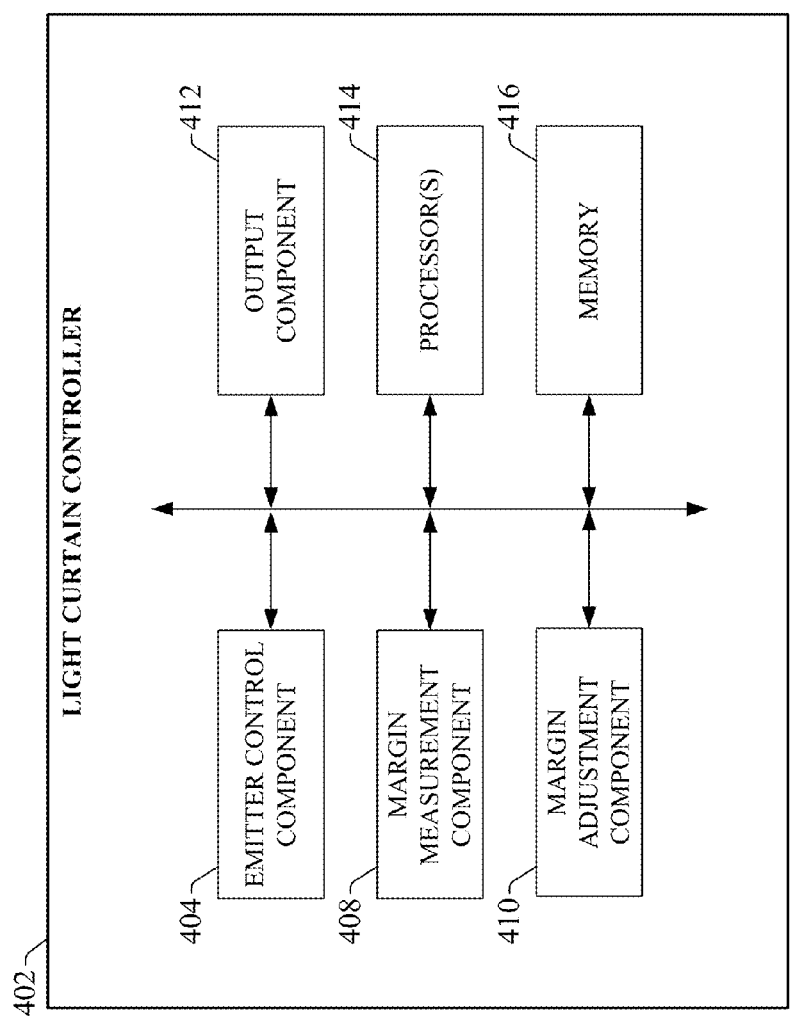
FIG. 4 is a block diagram of an example light curtain controller with sensitivity optimization capabilities.

FIG. 4 is a block diagram of an example light curtain controller 402 that supports sensitivity optimization according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Light curtain controller 402 can include an emitter control component 404, a margin measurement component 408, a margin adjustment component 410, an output component 412, one or more processors 414, and memory 416. In various embodiments, one or more of the emitter control component 404, margin measurement component 408, margin adjustment component 410, output component 412, the one or more processors 414, and memory 416 can be electrically and/or communicatively coupled to one another to perform one or more of the functions of the light curtain controller 402. In some embodiments, one or more of components 404, 408, 410, and 412 can comprise software instructions stored on memory 416 and executed by processor(s) 416. Light curtain controller 402 may also interact with other hardware and/or software components not depicted in FIG. 4. For example, processor(s) 414 may interact with one or more external user interface devices, such as a keyboard, a mouse, a display monitor, a touchscreen, or other such interface devices. Moreover, the light curtain controller 402 may include LED indicators or other types of indicators to convey state information to a user. The photoelectric sensor may also include a communication link (wired or wireless) for communicating such information as an object presence indication, health and/or status information for the light curtain, or other such information.

Emitter control component 404 can be configured to control emission of modulated light beams by the light curtain's emitter elements. During the initialization sequence, the emitter control component 404 can select individual emitter elements for light beam transmission, such that only the selected emitter element emits a light beam while that element's corresponding receiver element is being measured. The margin measurement component 408 can be configured to measure the operating margin for each receiver element of the light curtain's receiver unit based on a magnitude of the signal generated by the emitter element, which is a function of the amount of emitted light received at the receiver unit. The margin adjustment component 410 can be configured to modify the operating margin for each individual emitter-transmitter pair. In various embodiments, the margin adjustment component 410 can set the margin by modifying the gain of the receiver element's amplifier, modifying the beam intensity generated by the emitter element, or by a combination of both of these adjustments.

The output component 412 can be configured to control an output signal based on detection of emitted light beams at the receiving units. The one or more processors 414 can perform one or more of the functions described herein with reference to the systems and/or methods disclosed. Memory 416 can be a computer-readable storage medium storing computer-executable instructions and/or information for performing the functions described herein with reference to the systems and/or methods disclosed.

Figure 5:
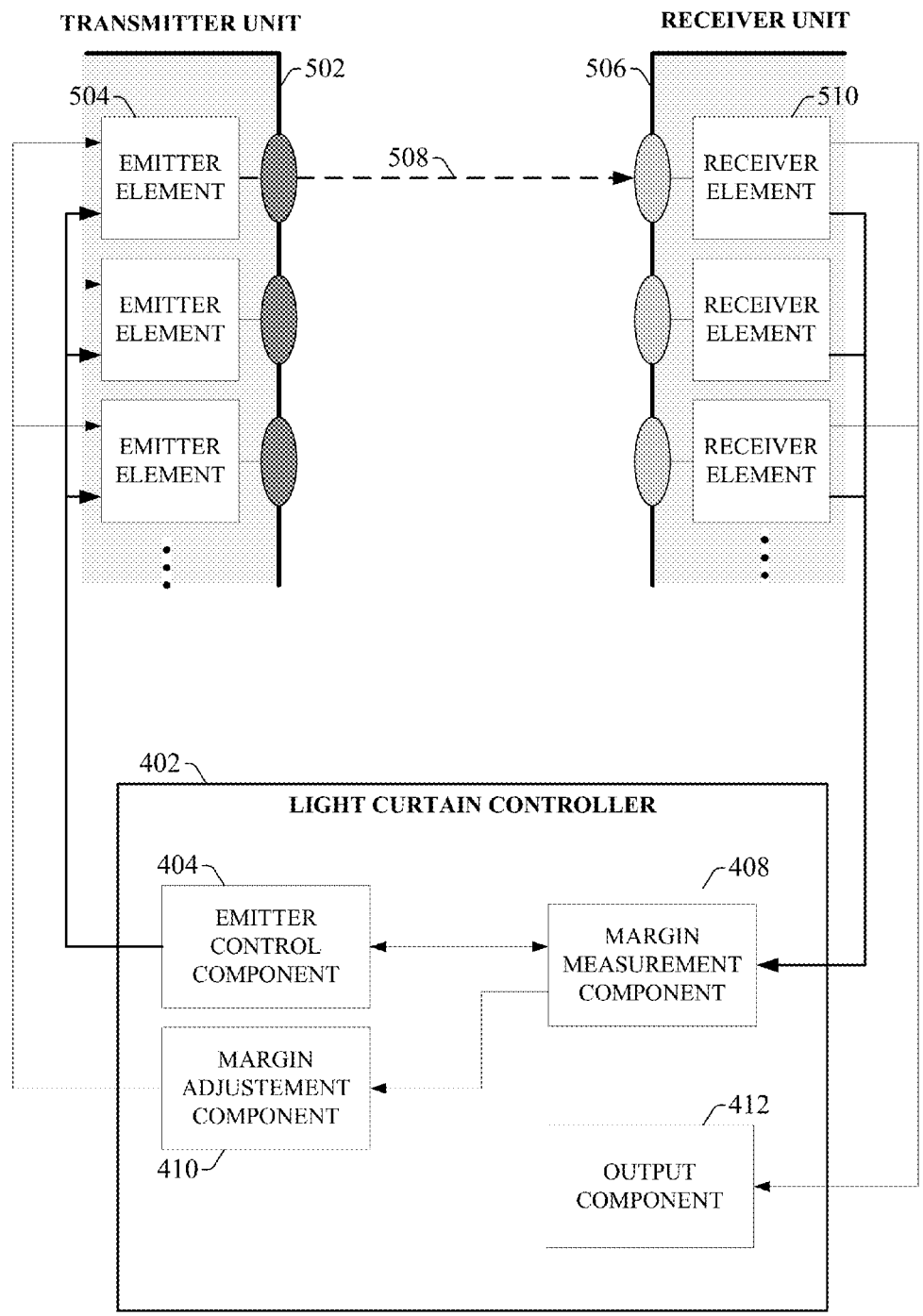
FIG. 5 is a block diagram illustrating generalized component interconnections of an example light curtain with sensitivity optimization capabilities.

FIG. 5 is a block diagram of an example light curtain with margin optimization capabilities. Transmitter unit 502 comprises a number of emitter elements 504, which may be functionally similar to emitter elements 110. For example, each emitter element can be configured to emit a pulse-modulated light beam 508. When mounted in parallel alignment with receiver unit 506, light beam 508 is received at a corresponding receiver element 510 of the receiver unit 506. The receiver element 510 converts the incident light beam to an electrical output, which is demodulated to yield an electrical signal. Demodulation may be implemented using analog functions, or realized in software after analog-to-digital conversion using digital signal processing filtering and detection algorithms. The receiver element 510 can then selectively filter the electrical signal, using either analog or digital filtering (or a combination of analog and digital filtering) and examine the filtered signal to determine whether the modulated signal is present at the expected amplitude. In this way, the receiver element 510 can distinguish between the emitted light beam and ambient (non-modulated) light or noise. Output component 412 then controls a state of an output signal based on a determination of whether the filtered signal corresponds to modulated light beam 508. In particular, output component 412 monitors all receiver elements during normal light curtain operation. If all receiver elements report detection of their corresponding emitted beams, the output component 412 sets the output signal to indicate a safe state (typically, an ON signal indicates the safe state). Alternatively, if one or more of the receiver elements fail to detect their associated beams, the output component 412 switches the state of the output signal to indicate an unsafe state (typically by turning the output signal OFF).

It is to be appreciated that the techniques described above for determining the presence of the emitted beam at the receiver elements are only intended to be exemplary, and that other techniques for detecting the emitted beams can be implemented in the light curtain without departing from the scope of this disclosure. In general, the margin tuning techniques described herein are not dependant on the particular techniques used by the receiver elements for detecting the presence or absence of the emitted beams.

The light curtain is configured with an initialization sequence that prepares the transmitter and receiver units (and their associated components) for normal operation. This initialization sequence may be performed automatically upon power-up of the light curtain, may be manually initiated (e.g., in response to a reboot command), and/or may be performed periodically during normal operation. According to one or more embodiments, the initialization sequence includes a margin optimization routine, whereby the light curtain controller 402 individually measures the operating margin of each emitter-receiver pair, and adjusts the margin to satisfy a defined optimization criterion based on the measurement. The light curtain controller 402 can perform this operation one channel at a time in a serial fashion until all emitter-transmitter pairs have been processed.

To facilitate serial margin optimization, light curtain controller 402 includes a margin measurement component 408 that is communicatively connected to each receiver element 510 of the receiver unit 506. Margin measurement component 408 is configured to measure the operating margin of each receiver element 510 when a test beam is emitted by the receiver element's corresponding emitter element 504. To coordinate light beam emission with margin measurement during the initialization sequence, an emitter control component 404 is configured to control light beam emission for each emitter element 504. In particular, emitter control component 404 can select an individual emitter element (e.g., the emitter element belonging to the emitter-receiver pair being tested at a given moment) and instruct the selected emitter element to transmit a light beam 508. Emitter control component 404 can select the emitter element based on instructions from the margin measurement component 408, which indicates to the emitter control component 404 which emitter-receiver pair is currently being measured and adjusted.

The example depicted in FIG. 5 represents a configuration in which the operating margins are adjusted by individually modifying the intensities of the beams emitted by the emitter elements (as will be described in more detail below, the operating margins can also be adjusted by modifying the receiver element gains). Accordingly, margin adjustment component 410 is communicatively connected to each emitter element and is configured to set the beam intensities individually for each emitter element in accordance with instructions received from the margin measurement component 408.

Figure 6:
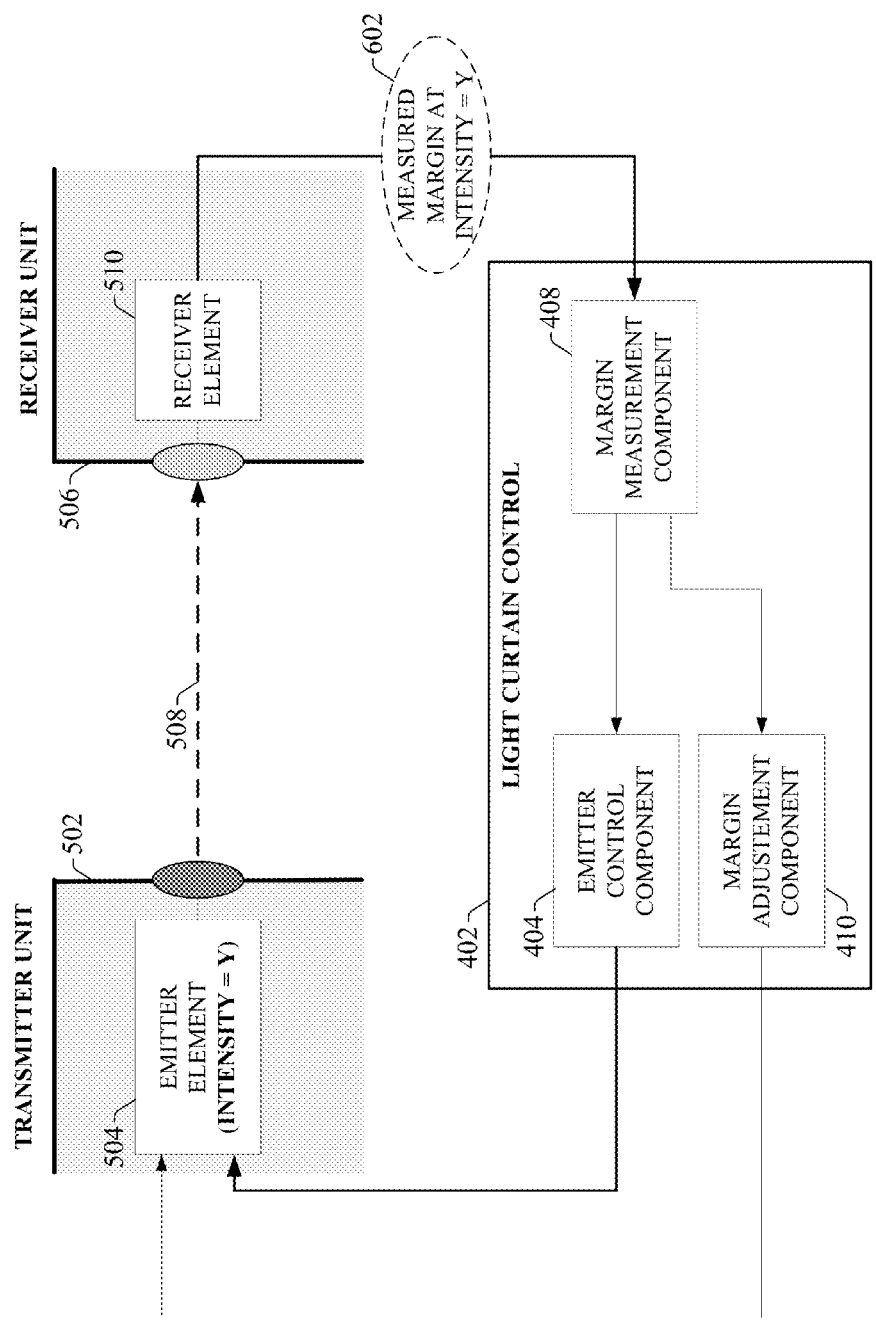
FIG. 6 is a diagram illustrating measurement of an operating margin of a single emitter-receiver pair.

FIG. 6 is a diagram illustrating measurement of an operating margin of a single emitter-receiver pair. In this example, it is assumed that emitter element 504 and receiver element 510 comprise the first emitter-receiver pair of the light curtain, and that emitter element 504 is initially set to emit its beam at an intensity level Y. When the light curtain's initialization sequence begins (e.g., upon power-up of the light curtain) the emitter control component 404 instructs emitter element 504 to emit its beam 508. During the margin optimization routine, the output component 412 is disabled to prevent undesirable intermittence of the light curtain's output signal. The receiver element 510 receives light beam 508, and margin measurement component 408 determines the operating margin 602 by measuring the magnitude of the amplified electrical signal generated by the receiver element 510, which is a function of the amount of light incident on the receiver element 510.

The margin measurement component 408 determines whether the measured operating margin satisfies a defined operating margin criterion. For example, in some embodiments the margin measurement component 408 may be configured to enforce an operating margin of 3X (that is, three times the minimum signal strength required for the receiver element to register detection of the light beam) for all light curtain channels, thereby ensuring a sufficiently strong margin for accurate signal switching while also placing an upper limit on the operating margin. Limiting the operating margin in this manner can prevent amplifier saturation and adjacent-channel signal bleed-through. It is to be appreciated that the 3X target margin in this example is only intended to be exemplary, and that any suitable criterion for adjusting the operating margin is within the scope of one or more embodiments of this disclosure.

Figure 7:
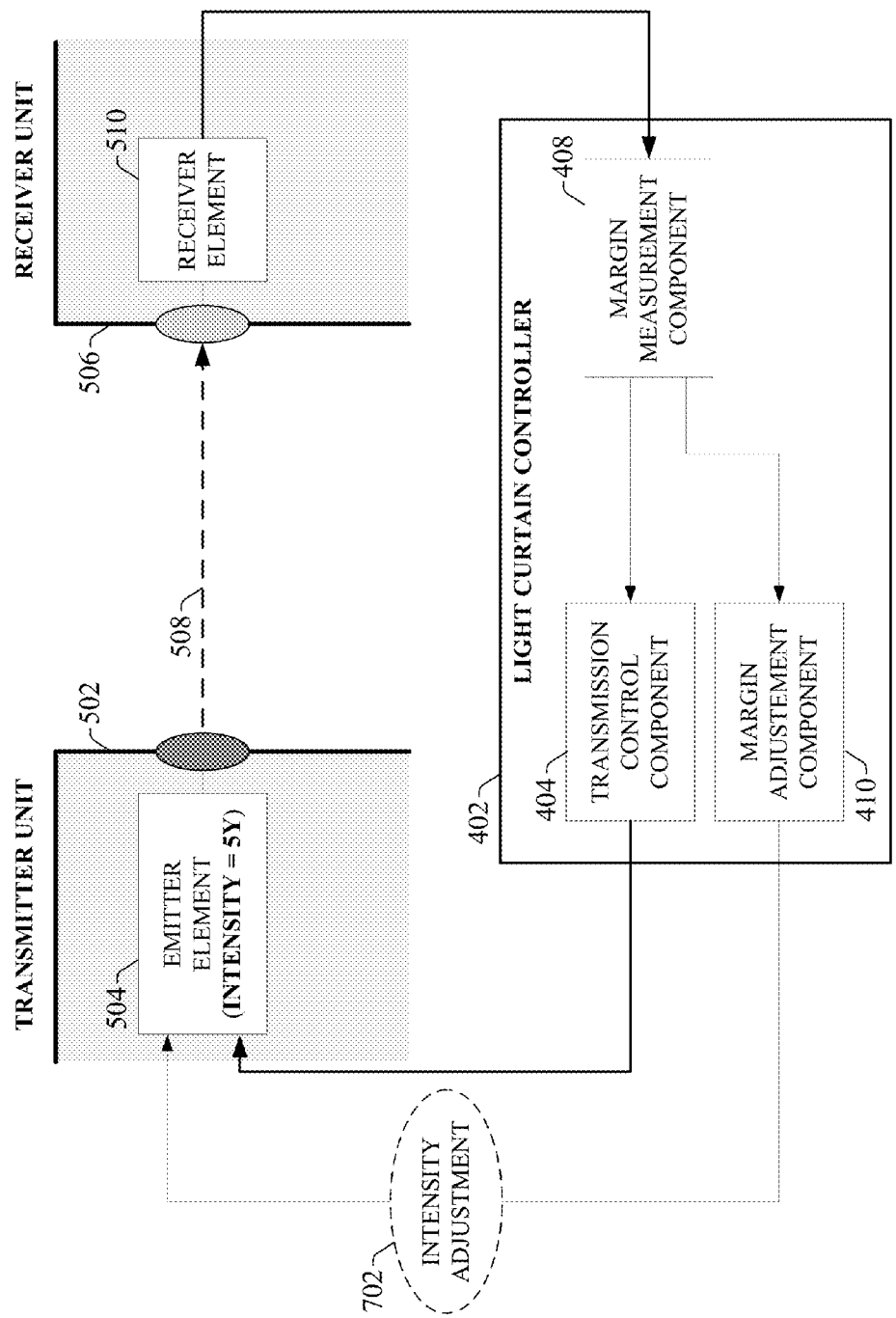
FIG. 7 is a diagram illustrating adjustment of a beam intensity setting to facilitate tuning the operating margin of a light curtain channel.

If the margin measurement component 408 determines that the measured margin satisfies the defined criterion within a defined tolerance, no adjustment is made to the emitter element 504, and the margin measurement component 408 instructs the emitter control component 404 to select the next emitter element in the series for margin tuning. Alternatively, if the measured margin does not satisfy the criterion, the margin measurement component 408 instructs the margin adjustment component 410 to adjust the operating margin by modifying the light beam intensity level of emitter element 504. The emitter control component 404 determines the direction and magnitude of the intensity adjustment based on the measured degree of deviation between the measured margin 602 and the margin criterion. In the present example, the margin measurement component 408 determines that the measured operating margin with the emitter element set to its current intensity level Y is approximately five times below a target operating margin defined by the margin criterion. Accordingly, as shown in FIG. 7, the margin adjustment component 410 sends an intensity adjustment signal 702 to emitter element 504 that increases the element's beam intensity setting to 5Y, or five times its initial intensity setting, thereby increasing the operating margin to approximately the desired level.

In some embodiments, this adjustment may end the margin tuning sequence for the first emitter-receiver pair, and the light curtain controller 402 will select the next emitter-transmitter pair in the series for margin tuning. Alternatively, in some embodiments, the margin measurement component 408 may perform a subsequent measurement of the operating margin to determine whether the intensity adjustment has brought the operating margin for the channel into compliance with the defined margin criterion. In such embodiments, the margin measurement component 408 and emitter control component 404 can iteratively measure the operating margin and adjust the intensity level as needed until the operating margin satisfies the margin criterion, upon which the light curtain controller 402 will select the next emitter-receiver pair and repeat this tuning process for the next channel. This tuning sequence is repeated for each emitter-transmitter pair sequentially until all light curtain channels have been tuned.

Figure 8:
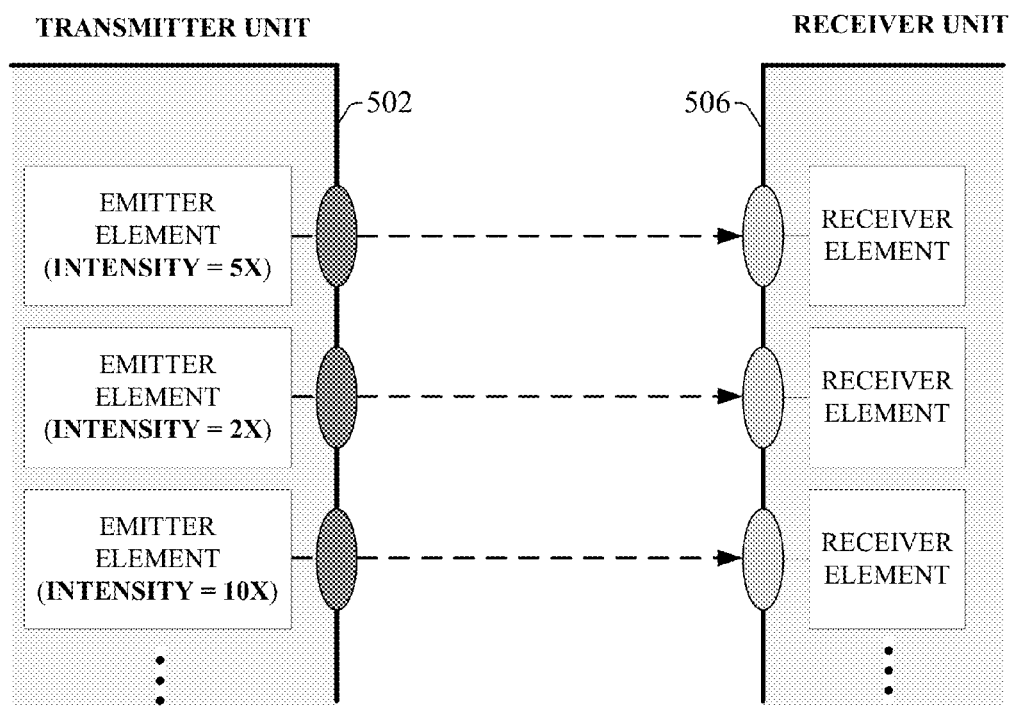
FIG. 8 is a diagram illustrating the first three channels of a light curtain after completion of a margin tuning sequence.

Using the techniques described above, the light curtain controller 402 tunes the operating margin for each light curtain channel by adjusting the light beam intensity for each emitter element individually, thereby substantially optimizing the operating margin for each channel. FIG. 8 is a diagram illustrating the first three channels of the light curtain after completion of the margin tuning sequence. Since each emitter element can be tuned individually, the intensity settings for the emitter elements can vary across the channels depending on the variables that affect the operating margins of each channel (e.g., degree of vibration experienced by each channel, the amount of pollution between each pair of emitter and receiver elements, varying distances between the emitter and receiver elements due to imperfect alignment, etc.).

Figure 9:
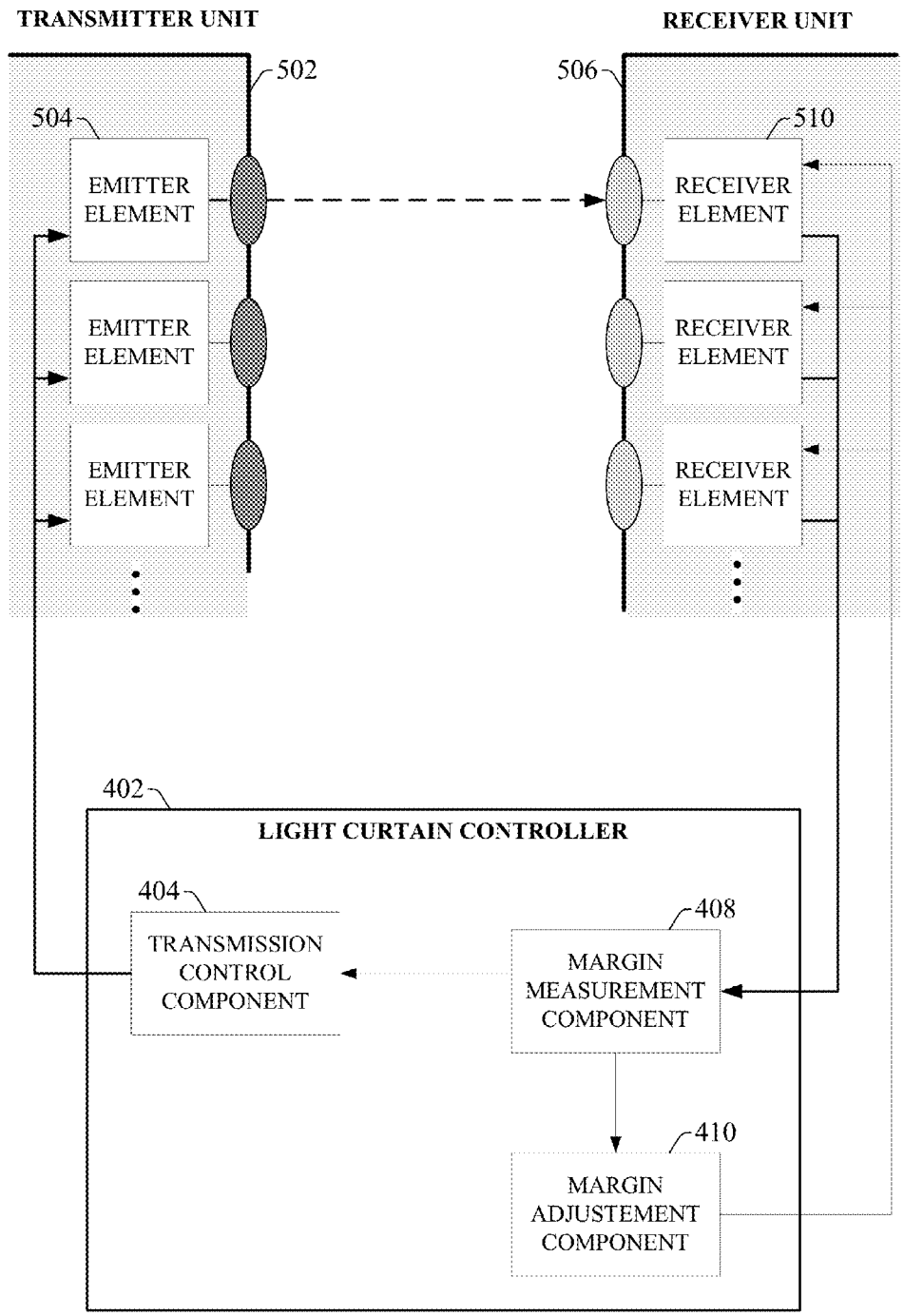
FIG. 9 is a diagram illustrating an embodiment in which operating margins are tuned by adjusting receiver element gains.

As noted above, some embodiments of the margin adjustment component 410 can tune the operating margin for the emitter-receiver pairs by adjusting the amplifier gains of the receiver elements rather than (or in addition to) modifying the beam intensities of the emitter elements. FIG. 9 is a diagram illustrating an embodiment in which the margins are tuned by adjusting the receiver element gains. Similar to the embodiment depicted in FIG. 5, light curtain controller 402 includes a emitter control component 404 that controls which emitter element 504 of the transmitter unit will emit a modulated beam, and a margin measurement component 408 that measures the operating margin for each light curtain channel and determines whether the measured margin satisfies a defined margin criterion. In this example, margin adjustment component 410 is communicatively connected to each receiver element 510, such that the margin adjustment component 410 can set the gain values for each receiver element individually based on the measured operating margins.

Figure 10:
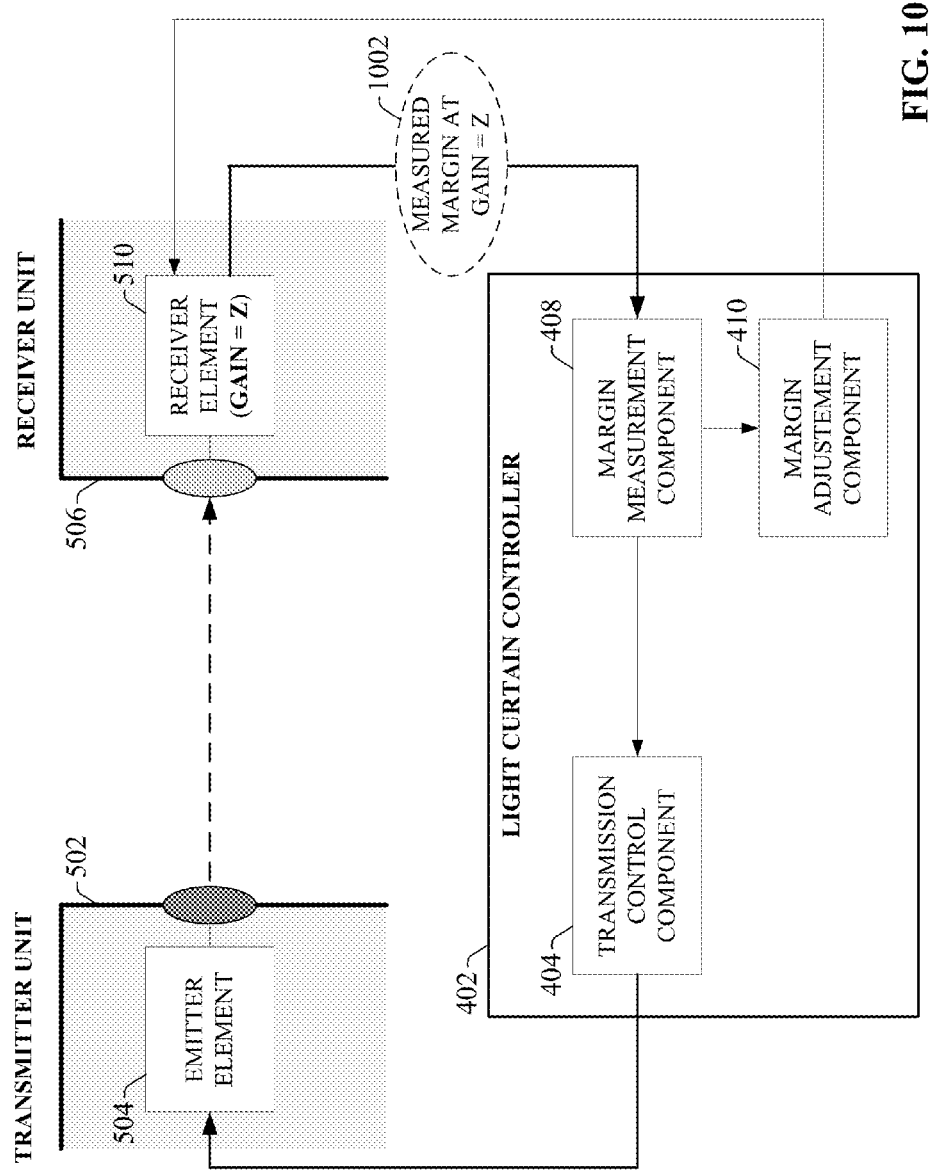
FIG. 10 is a diagram illustrating measurement of the operating margin of a single emitter-receiver pair.
Figure 11:
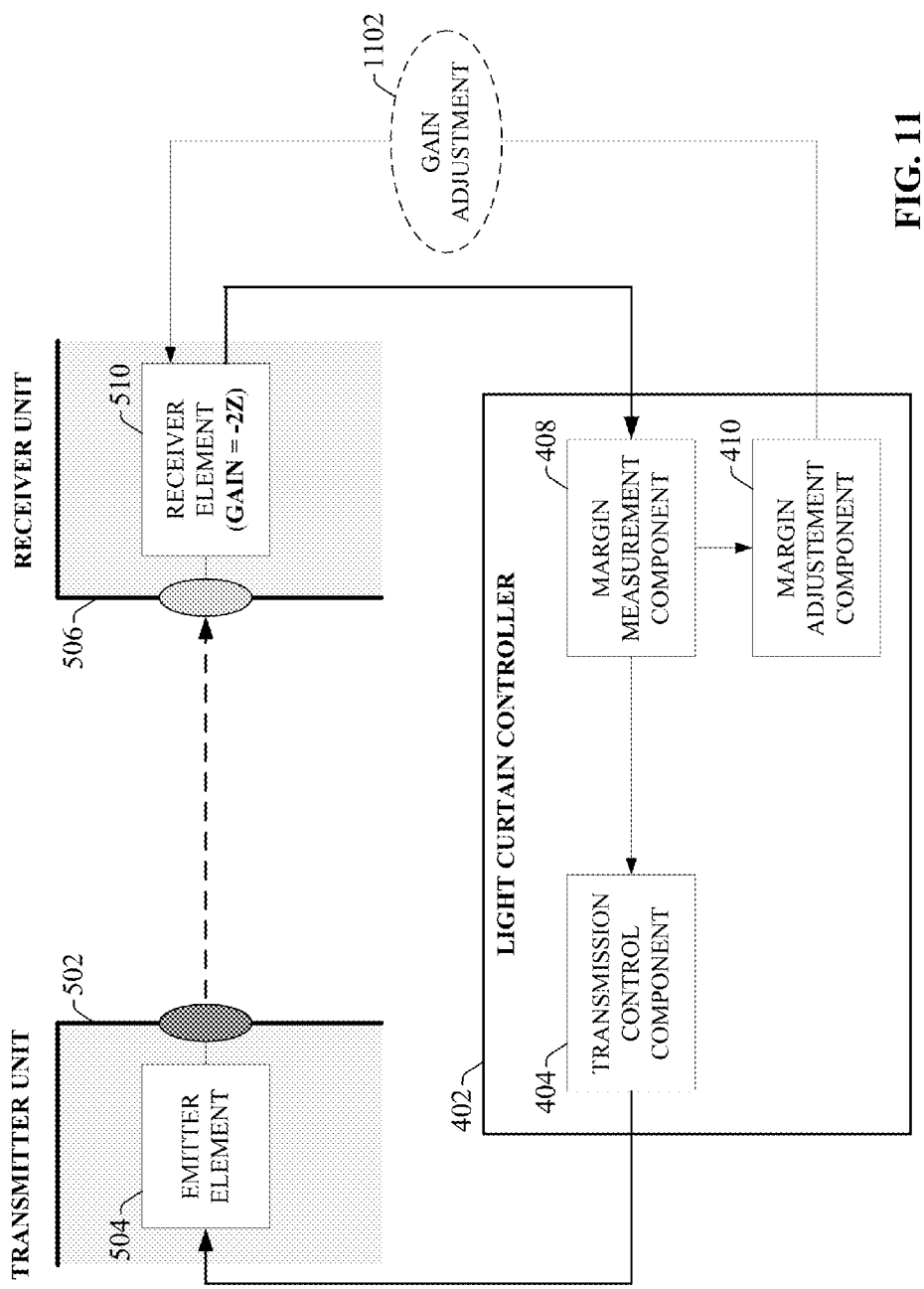
FIG. 11 is a diagram illustrating adjustment of a receiver element gain setting to facilitate tuning the operating margin of a light curtain channel.

FIG. 10 is a diagram illustrating measurement of the operating margin of a single emitter-receiver pair. Initially, the amplifier of the pair's receiver element 510 is set to Z. When the pair is selected for tuning during the margin optimization sequence, emitter control component 404 instructs the pair's emitter element 504 to emit a light beam, which is received at receiver element 510. Margin measurement component 408 then measures the operating margin 1002 with the receiver element's gain set to its initial value of Z, and determines whether this measured margin 1002 satisfies the defined margin criterion. If the margin 1002 satisfies the criterion, the emitter control component 404 and margin measurement component 408 select the next emitter-receiver pair in the series for margin tuning. Alternatively, if the margin 1002 does not satisfy the criterion, the margin measurement component 408 determines the direction and magnitude of the margin's deviation from the defined margin criterion so that a suitable gain adjustment can be calculated. For example, as illustrated in FIG. 11, if the margin criterion specifies that each light curtain channel is to have an operating margin of 3X, and the measured margin 1002 is determined to be approximately 6X, the margin adjustment component 410 can send a gain adjustment command 1102 to the receiver element 510 that decreases the element's gain by a factor of 2 (Gain=-2Z). In some embodiments, this adjustment may signal the end of the tuning process for the selected emitter-transmitter pair, and the light curtain controller 402 will then select the next light curtain channel for tuning. Alternatively, some embodiments of the light curtain controller 402 may take a subsequent margin measurement after adjusting the receiver unit's gain setting to verify that the new operating margin satisfies the defined criterion. In such embodiments, if the new operating margin still does not satisfy the defined criterion, the margin adjustment component 410 can make an additional adjustment to the gain value. This process may be iteratively performed for the channel until the operating margin satisfies the defined margin criterion.

Figure 12:
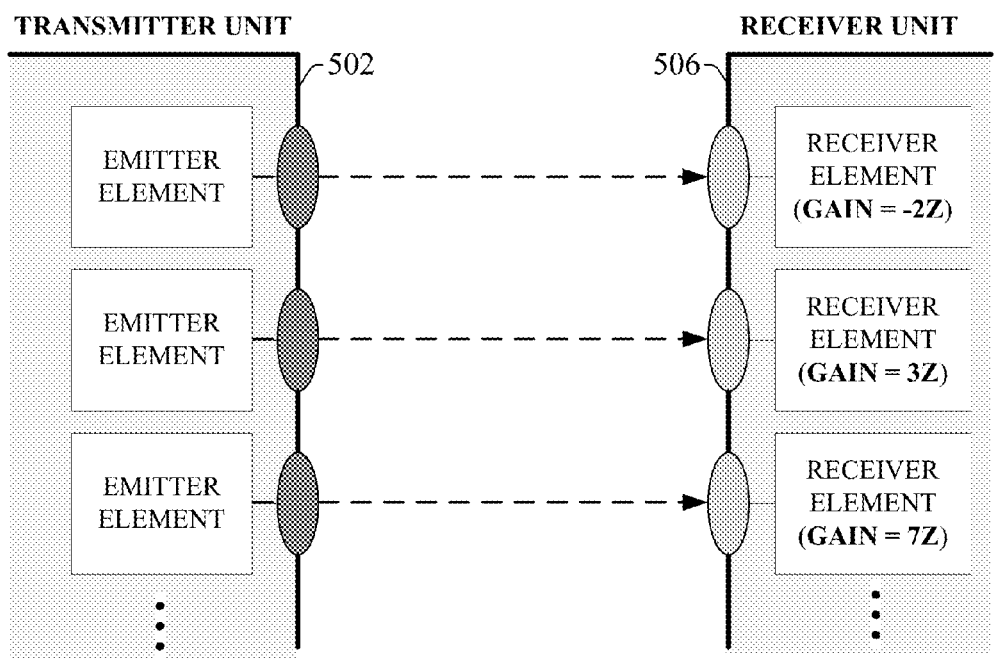
FIG. 12 is a diagram illustrating the first three channels of the light curtain after completion of a margin tuning sequence.

FIG. 12 is a diagram illustrating the first three channels of the light curtain after the margin tuning sequence is complete. Since the gains can be adjusted for each receiver element individually, each channel can be made to conform to a defined operating margin regardless of the different contextual variables (e.g., pollution, vibration, light noise, alignment, etc.) that affect each individual channel.

As noted above, some embodiments of the light curtain controller can adjust both the beam intensity and the receiver gain values in order to optimize the margin for a given channel. In order to minimize the receiver's susceptibility to noise, such embodiments of the light curtain controller can be configured to favor higher beam intensity over higher receiver gain when making adjustments to the operating margin. For example, if the margin measurement component 408 determines that the operating margin should be increased for a channel in order to satisfy the defined margin criterion, the margin adjustment component 410 will first increase the beam intensity of the emitter element until either the desired operating margin is reached or the beam intensity reaches its maximum intensity. If the beam intensity becomes maximized and the operating margin is still determined to be too low, the margin adjustment component 410 will then begin increasing the receiver gain until the operating margin satisfies the defined margin criterion.

Conversely, if the margin measurement component 408 determines that the operating margin should be decreased, the margin adjustment component 410 will first decrease the receiver gain until either the operating margin satisfies the margin criterion or the receiver gain reaches its minimum value. If the operating margin must be further decreased after the gain has reached its minimum value, the margin adjustment component 410 will then begin decreasing the beam intensity of the emitter element until the operating margin satisfies the margin criterion.

The margin tuning techniques described above can ensure that a consistent operating margin is used across all channels of the light curtain. The defined margin criterion enforced by the margin measurement and margin adjustment components can ensure a sufficiently high margin for accurate object detection and signal processing, while preventing adjacent-channel signal bleed-through by limiting excessive margin for all channels. Enforcing an optimal operating margin for all channels can also minimize the receiver elements' susceptibility to ambient light noise.

As described above, the margin tuning sequence can be performed automatically upon power-up of the light curtain as part of the light curtain's initialization sequence. In some embodiments, the light curtain controller may also be configured to periodically re-execute the tuning sequence during normal operation in order to compensate for changes in the environmental variables that affect the operating margins. For example, if the light curtain is installed in a production area that generates particulates or smoke during its manufacturing process, the amount of air pollution between the transmitter and receiver units may vary throughout the work shift. In order to maintain a consistent operating margin for all light curtain channels, the light curtain controller 402 may be configured to re-execute the margin tuning sequence periodically in order to re-adjust the beam intensities or receiver gains as needed to ensure consistent operation despite variable environmental factors.

Figure 13:
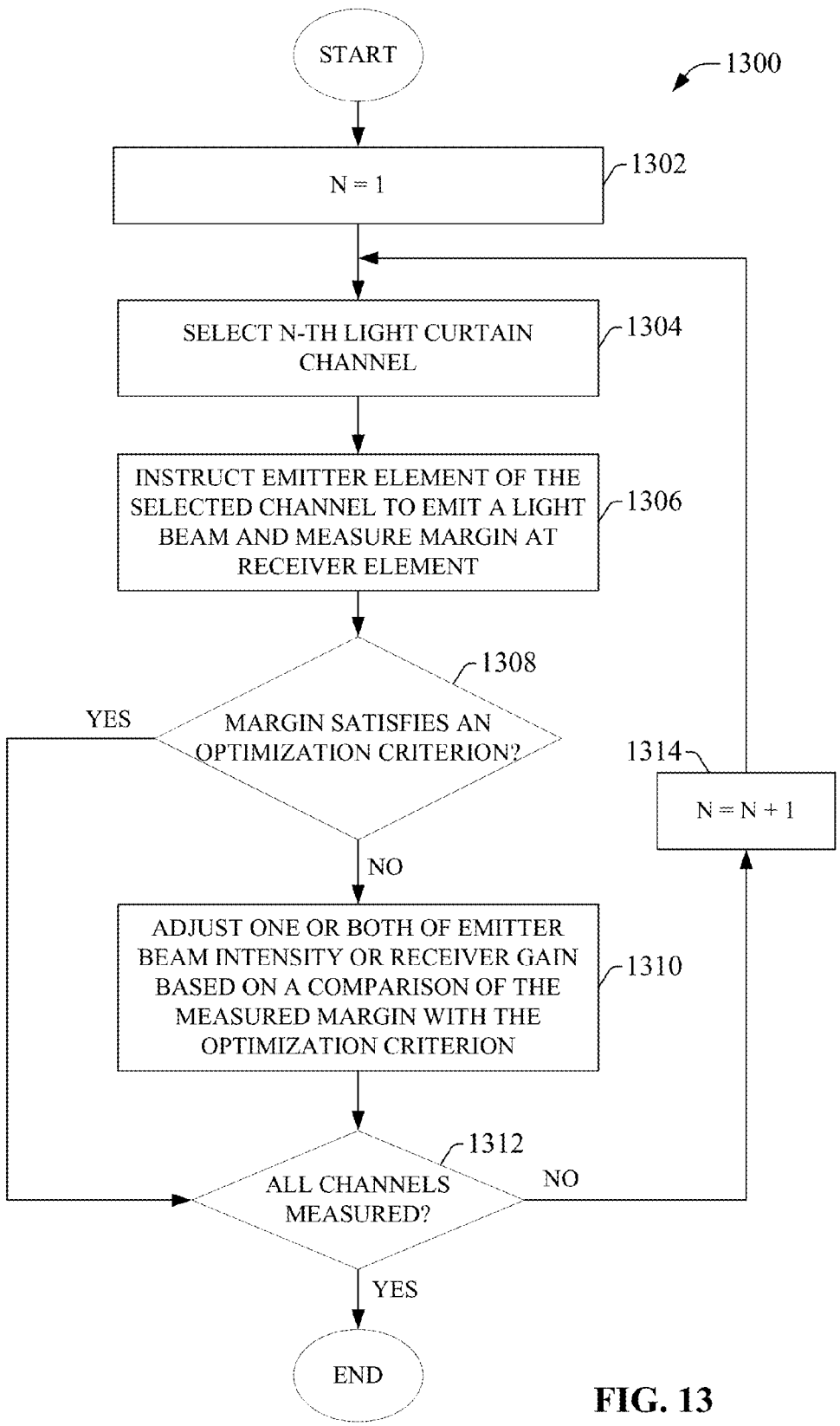
FIG. 13 is a flowchart of an example methodology for individually tuning the operating margins for respective channels of a light curtain.

FIG. 13 illustrates a methodology in accordance with one or more embodiments of the subject application. While, for purposes of simplicity of explanation, the methodology is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies.

FIG. 13 illustrates an example methodology 1300 for individually tuning the operating margins for respective channels of a light curtain. In some scenarios, methodology 1300 can be executed as part of an initialization routine that is triggered upon power-up of the light curtain. Methodology 1300 may also executed by the light curtain periodically to maintain a consistent operating margin for the light curtain despite variable operating conditions.

Initially, at 1300, a variable N is set to 1. At 1304, an Nth channel of a light curtain is selected for tuning. At 1306, the emitter element of the selected channel is instructed to emit a light beam, and the margin at the channel's receiver element is measured. At 1308, a determination is made regarding whether the margin measured at step 1306 satisfies an optimization criterion. If the margin satisfies the criterion (YES at step 1308), the methodology moves to step 1312 without making further adjustments to the channel. Alternatively, if the margin does not satisfy the criterion (NO at step 1308), the methodology moves to step 1310 where one or both of the emitter beam intensity or the receiver gain is adjusted based on a comparison of the measured margin with the optimization criterion.

At 1312, a determination is made regarding whether all light curtain channels have been measured. If all channels have not been measured (NO at step 1312), the methodology moves to step 1314, where the variable N is incremented. The methodology then returns to step 1304, where the next light curtain channel is selected for tuning, and steps 1306-1312 are repeated for the next channel. If it is determined at step 1312 that all channels have been measured (YES at step 1312), the methodology ends.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
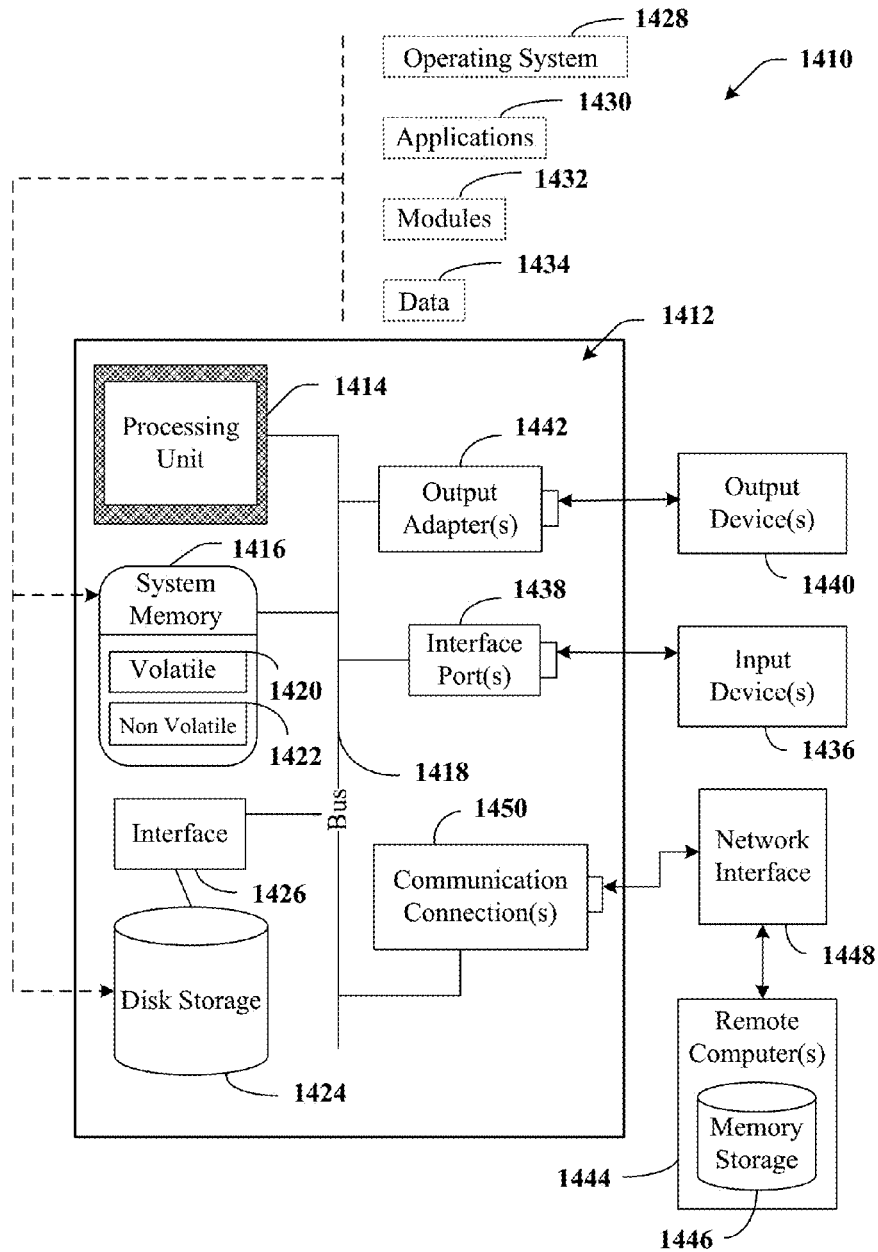
FIG. 14 is an example computing environment.
Figure 15:
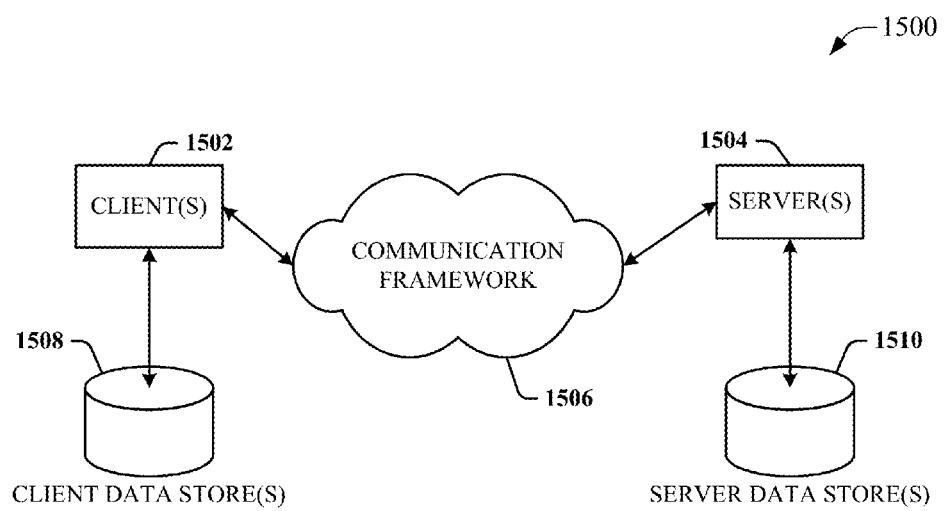
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multicore microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1330 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A light curtain control system, comprising:
  a memory that stores executable components; and
  a processor, operatively coupled to the memory, that executes the executable components, the executable components comprising:
    an emitter control component configured to select an emitter element of a channel of a light curtain and instruct the emitter element to emit a light beam;
    a margin measurement component configured to determine an operating margin for the channel based on a measured signal generated by a receiver element of the channel in response to receipt of the light beam; and
    a margin adjustment component configured to, in response to a determination that the operating margin does not satisfy a defined margin criterion, individually adjust the operating margin for the channel by increasing or decreasing an amplifier gain setting of the receiver element until the amplifier gain setting reaches one of a maximum gain or a minimum gain of the receiver element, and in response to determining that the operating margin does not satisfy the defined margin criterion while the amplifier gain is at the maximum gain or minimum gain, increasing or decreasing a beam intensity setting of the emitter element.

2. The light curtain control system of claim 1, wherein the emitter control component, the margin measurement component, and the margin adjustment component are configured to measure and individually adjust the operating margin for each channel of multiple channels of the light curtain in a serial manner.

3. The light curtain control system of claim 1, wherein the defined margin criterion comprises a defined operating margin or a defined operating margin range.

4. The light curtain control system of claim 1, wherein the emitter control component, the margin measurement component, and the margin adjustment component are configured to measure and individually adjust the operating margin in response to power-up of the light curtain.

5. The light curtain control system of claim 1, wherein the emitter control component, the margin measurement component, and the margin adjustment component are configured to measure and individually adjust the operating margin periodically during operation of the light curtain.

6. The light curtain control system of claim 1, wherein the emitter control component, the margin measurement component, and the margin adjustment component are configured to iteratively measure and adjust the operating margin until the operating margin satisfies the defined margin criterion.

7. The light curtain control system of claim 1, wherein the margin adjustment component is configured to increase or decrease the amplifier gain setting of the receiver element by a degree determined based on a magnitude of a deviation of the operating margin from the defined margin criterion.

8. A method for tuning operating margins for a light curtain, comprising:
  selecting, by a system comprising a processor, a channel of a plurality of channels of the light curtain for tuning;
  instructing, by the system, an emitter element of the channel to emit a light beam;
  measuring, by the system, an operating margin for the channel based on a measured signal at a receiver element of the channel; and
  individually adjusting, by the system, the operating margin for the channel in response to a determination that the operating margin does not satisfy a defined margin criterion, wherein the individually adjusting comprises:
    increasing or decreasing an amplifier gain of the receiver element until the amplifier gain reaches a maximum gain or a minimum gain of the receiver element; and
    in response to determining that the operating margin does not satisfy the defined margin criterion while the amplifier gain is set to the minimum gain or the maximum gain, increasing or decreasing a beam intensity setting of the emitter element.

9. The method of claim 8, further comprising repeating the selecting, the instructing, the measuring, and the individually adjusting for each channel of the plurality of channels of the light curtain in a serial manner.

10. The method of claim 8, further comprising determining that the operating margin does not satisfy the defined margin criterion based on a comparison between the operating margin and at least one of a specified operating margin or a specified operating margin range.

11. The method of claim 8, further comprising performing the selecting, the instructing, the measuring, and the individually adjusting in accordance with an initialization sequence of the light curtain.

12. The method of claim 8, further comprising performing the selecting, the instructing, the measuring, and the individually adjusting periodically during operation of the light curtain.

13. The method of claim 8, further comprising iteratively performing the selecting, the instructing, the measuring, and the individually adjusting for the channel until the operating margin satisfies the defined margin criterion.

14. The method of claim 8, wherein the increasing or decreasing the amplifier gain comprises increasing or decreasing the amplifier gain by a magnitude determined based on a magnitude of a deviation between the operating margin and the defined margin criterion.

15. A non-transitory computer-readable medium having stored thereon instructions that, in response to execution, cause a system comprising a processor to perform operations, the operations comprising:
  selecting an emitter-receiver pair of a set of emitter-receiver pairs of a light curtain;
  instructing an emitter element of the emitter-receiver pair to emit a light beam;
  measuring an operating margin for the emitter-receiver pair based on a magnitude of a signal generated by a receiver element of the emitter-receiver pair in response to receipt of the light beam; and
  individually adjusting the operating margin for the emitter-receiver pair in response to a determination that the operating margin does not satisfy a defined margin criterion,
  wherein the individually adjusting comprises:
    instructing the receiver element to increase or decrease an amplifier gain setting of the receiver element until the amplifier gain setting reaches one of a maximum gain or a minimum gain of the receiver element, and
    instructing the emitter element to increase or decrease a beam intensity setting in response to determining that the operating margin does not satisfy the defined margin criterion while the receiver element is at the maximum gain or minimum gain.

16. The non-transitory computer-readable medium of claim 15, wherein the operations further comprise, in response to determining that the emitter-receiver pair is not a last emitter-receiver pair of the set of emitter-receiver pairs of the light curtain, selecting a next emitter-receiver pair of the set of emitter-receiver pairs of the light curtain and repeating the instructing, the measuring, and the individually adjusting for the next emitter-receiver pair.

17. The non-transitory computer-readable medium of claim 15, further comprising performing the selecting, the instructing, the measuring, and the individually adjusting in response to a start of an initialization sequence of the light curtain.

18. The non-transitory computer-readable medium of claim 15, further comprising performing the selecting, the instructing, the measuring, and the individually adjusting periodically during operation of the light curtain.

19. The non-transitory computer-readable medium of claim 15, further comprising iteratively performing the selecting, the instructing, the measuring, and the individually adjusting for the emitter-receiver pair until the operating margin satisfies the defined margin criterion.

20. The non-transitory computer-readable medium of claim 15, wherein the instructing the receiver element comprises determining a magnitude of an instructed increase or decrease of the amplifier gain setting based on a magnitude of a deviation of the operating margin from the defined margin criterion.

* * * * *